(12) United States Patent
Thakur (10) Patent No.: US 6,914,700 B2
(45) Date of Patent: Jul. 5, 2005

(54) METHOD FOR REDUCING MIGRATING RESIDUAL ERROR IN ERROR DIFFUSION HALFTONING

(75) Inventor: Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 250 days.

(21) Appl. No.: 10/417,843

(22) Filed: Apr. 17, 2003

(65) Prior Publication Data

US 2004/0207880 A1 Oct. 21, 2004

(51) Int. Cl.$^7$ .......................... H04N 1/405; H04N 1/409

(52) U.S. Cl. ...................... 358/3.04; 358/3.06; 358/3.26

(58) Field of Search .............................. 358/3.04, 3.03, 358/3.05, 1.9, 3.06, 3.13, 3.26, 534; 382/252; 345/616

(56) References Cited

U.S. PATENT DOCUMENTS

| | | | |
|---|---|---|---|
| 4,603,125 A | 7/1986 | Atwell et al. | |
| 4,630,125 A | 12/1986 | Roetling | |
| 4,717,964 A | 1/1988 | Abe et al. | |
| 4,803,558 A | 2/1989 | Hiratsuka et al. | |
| 4,975,786 A | 12/1990 | Katayama et al. | |
| 5,016,118 A | 5/1991 | Nannichi | |
| 5,077,812 A | 12/1991 | Kanno et al. | |
| 5,148,495 A | 9/1992 | Imao et al. | |
| 5,245,676 A | 9/1993 | Spitz | |
| 5,268,771 A | 12/1993 | Murakami et al. | |
| 5,278,671 A | 1/1994 | Takahashi et al. | |
| 5,291,309 A | 3/1994 | Semasa | |
| 5,317,653 A | 5/1994 | Eschbach et al. | |
| 5,331,442 A | 7/1994 | Sorimachi | |
| 5,341,224 A | 8/1994 | Eschbach | |
| 5,351,138 A | 9/1994 | Sasaki et al. | |
| 5,359,430 A | 10/1994 | Zhang | |
| 5,361,142 A | 11/1994 | Semasa | |
| 5,384,647 A | 1/1995 | Fukushima | |
| 5,499,111 A | 3/1996 | Sato et al. | |
| 5,519,509 A | 5/1996 | Hikosaka et al. | |
| 5,534,945 A | 7/1996 | Edgar | |
| 5,541,743 A | 7/1996 | Shiomi et al. | |
| 5,617,485 A | 4/1997 | Ohuchi et al. | |
| 5,631,748 A | 5/1997 | Harrington | |
| 5,642,204 A | 6/1997 | Wang | |
| 5,680,478 A | 10/1997 | Wang et al. | |
| 5,680,479 A | 10/1997 | Wang et al. | |
| 5,710,640 A | 1/1998 | Suzuki | |
| 5,712,963 A | 1/1998 | Kobayashi et al. | |

(Continued)

FOREIGN PATENT DOCUMENTS

JP           9281190           10/1997

OTHER PUBLICATIONS

Robert W. Floyd and Louis Steinberg, "An Adaptive Algorithm for Spatial Greyscale," Proceedings of the SID, p. 75–77, (Apr. 17, 1976).

*Primary Examiner*—Scott Rogers
(74) *Attorney, Agent, or Firm*—Frederick H. Gribbell (57) ABSTRACT

A method for reducing or eliminating residual error when "blank" pixels are found in the input image data is provided, such as one that can be used in printers of the type which use error diffusion as part of the halftoning process. When a blank pixel is found, the residual error may be immediately reduced in magnitude in one embodiment. In another embodiment, a "hop count" value is increased (or incremented) when a blank pixel is found, and if sufficient consecutive blank pixels exist in the input data, the hop count achieves a threshold and then either decimates or eliminates the residual error, thus limiting the migration of residual error. If a non-blank pixel is found in the input data before the threshold is achieved, the hop count is reset to zero.

30 Claims, 4 Drawing Sheets

U.S. PATENT DOCUMENTS

| | | |
|---|---|---|
| 5,774,167 A | 6/1998 | Hara |
| 5,838,463 A | 11/1998 | Gahang |
| 5,883,973 A | 3/1999 | Pascovici et al. |
| 5,911,004 A | 6/1999 | Ohuchi et al. |
| 5,966,462 A | 10/1999 | Linder et al. |
| 5,987,221 A | 11/1999 | Bearss et al. |
| 6,081,625 A | 6/2000 | Sakue |
| 6,178,267 B1 | 1/2001 | Sato et al. |
| 6,324,309 B1 | 11/2001 | Tokuyama et al. |
| 6,327,043 B1 | 12/2001 | Rumph |
| 6,333,793 B1 | 12/2001 | Kobayashi |
| 6,356,362 B1 | 3/2002 | Ostromoukhov |
| 6,360,009 B2 | 3/2002 | Li et al. |
| 6,407,824 B1 | 6/2002 | Hashimoto |
| 6,445,463 B1 | 9/2002 | Klassen |
| 6,476,934 B1 | 11/2002 | Ilbery et al. |
| 6,771,832 B1 * | 8/2004 | Naito et al. .................. 382/252 |
| 2001/0020949 A1 | 9/2001 | Gong et al. |
| 2002/0031263 A1 | 3/2002 | Yamakawa |
| 2002/0057444 A1 | 5/2002 | Ishikawa |
| 2002/0075494 A1 | 6/2002 | Kakutani |
| 2002/0089696 A1 | 7/2002 | Yamamoto |
| 2004/0010633 A1 * | 1/2004 | Ishikawa |

\* cited by examiner

METHOD FOR REDUCING MIGRATING RESIDUAL ERROR IN ERROR DIFFUSION HALFTONING

TECHNICAL FIELD

The present invention relates generally to image forming equipment and, in one embodiment, is particularly directed to printers of the type which use error diffusion as part of the halftoning process. The invention is specifically disclosed as a method for reducing or eliminating residual error when white or "blank" pixels are found in the input image data.

BACKGROUND OF THE INVENTION

Error diffusion is a method used in halftoning digital image data, and the step of halftoning converts inputted multi-level image data into bi-level output data, also known as a bitmap. In typical error diffusion processes, each input pixel value is compared to a threshold, and if the input is greater than the threshold, then the bi-level output bit is turned ON to print a dot of the particular color being processed. When using 8-bit pixel data, the possible values for the multi-level inputs are in the range of 0–255. In that situation, the dot being printed is typically assigned a value equal to "255." However, in much image data it is rare that the actual pixel value being submitted to the threshold test is equal to exactly 255, and thus there will be some remaining numeric data value (the "error") that is spread to other pixel locations that have yet to be processed. This of course is the "diffusion" aspect of error diffusion processing. If all of the image data is "text" or "character" data, which may have values of only zero (0) or "255," then the error resulting from the threshold test for these numbers would always be zero (0), and there would be no error numeric value to be diffused to neighboring pixels.

However, in continuous tone ("contone") data, which is typical for any type of computer-generated image or photographic image as the source of image data, the input pixel value will rarely be at "255" since that would be a full saturated color value, and such values would not normally occur in such continuous tone image data. In that situation, the threshold step will produce either a dot to be printed or a white or "blank" space (which is a non-dot), and such values when related to the 8-bit precision of the input data would be worth a value of "255" or "0," respectively.

If the input pixel value is less than the threshold value, then the output from the threshold test will be turned OFF, and the input numeric value will be spread (or diffused) to its neighboring pixels as the "residual error." In typical printers available today, the error spreading is done based upon ratios assigned for each direction in which the error will be spread. If the input pixel value is greater than the threshold value, then the difference between the input pixel value and the maximum pixel value (which is typically "255" in an 8-bit system) will become the "residual error" that is spread to the neighboring pixels yet to be processed.

It will be understood that the "next" pixel to be processed will have a component of residual error passed to it from the "previous" pixel that was just processed (and may have additional residual error components from other previously processed pixels as well), and this residual error component is typically added (using an error buffer) to the input pixel value of the input image data at this current pixel location. It is thus possible for a pixel location with an input value of zero (0) to nevertheless have a dot printed in situations where the residual error component added at this particular pixel location happens to be greater than the threshold at this same pixel location. This may occur particularly if a threshold array is used, and this particular array position has a somewhat "low" threshold value, thus making it "easier" for a dot to be printed at this pixel location. Of course, if the input pixel "raw" data was truly at zero (0), then it is unlikely that it would be preferential for a dot to be placed at this pixel location.

In a "smooth" image (also referred to as continuous tone image data), the natural image errors are added to and subtracted from the error buffer throughout the halftoning process for all the pixel locations of the image that is to be rendered into a bitmap. This keeps the error buffer active, and pixels are essentially influenced by their close neighbors only. For character or geometric images, however, the error buffer may become inactive as input image data is processed through blank input pixels, and errors can be carried over limitlessly. Therefore, pixels in one area can influence pixels in another area at quite some distance relative to the overall bitmap for a printed page. One manifestation of this problem occurs when lines may become missing or faint if the image contains very fine parallel lines. Another problem occurs when graphic image data (which could be continuous tone data from photographs, or perhaps from computer-generated graphic data) occurs in one area of a bitmap, and then a large number of blank pixels are found in a consecutive pattern until reaching another set of contone image data, sometimes on the same scanline. In this situation of two different contone images on the same scanline, the residual error from the "last pixel" location of the first image will be carried over to the "first pixel" location of the second image, and this residual error could make the second image's first pixel either more difficult or less difficult to be printed as a dot at that location, strictly due to this "carried over residual error." Again, pixels in one area may influence pixels in a second area that are some distance from the first area (at least as far as counting rather tiny bitmap pixel locations is concerned).

It would be an improvement to address the problem of such migrating residual error by limiting the extent to which an error can be spread from its origin.

SUMMARY OF THE INVENTION

Accordingly, it is an advantage of certain embodiments of the present invention to provide an image processing method that uses error diffusion to limit the extent to which residual error can be spread from one pixel location to another in situations where blank pixels are found in the input image data.

It is another advantage of certain embodiments of the present invention to provide an error diffusion process such that the residual error is reduced or eliminated at pixel locations in which the input image data is equal to a blank pixel.

It is another advantage of certain embodiments of the present invention to provide an error diffusion processing method in which residual error is controlled when the image processing passes through a blank input pixel, by providing a counter that increments each time the process passes through a blank pixel, or that resets the counter when a non-blank pixel is found, and if the counter reaches a predetermined threshold, the residual error is either reduced to zero (0) or is decimated.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for reducing the effects of migrating residual error in an image forming apparatus is provided, in which the method comprises: (a) receiving an input data value for a first pixel position of a multi-level image; (b) receiving a first error value from at least one preceding pixel position; (c) adding the input data value to the first error value, thereby generating a resulting new value (e.g., a NewValue variable); (d) determining, via a halftoning procedure on the new value, whether a dot will be recorded at the first pixel position, and: (i) if a dot is not recorded, loading a current value of the new value into a residual error value; (ii) if a dot is recorded, subtracting a predetermined dot worth value from the new value, and loading the result into the residual error value; (e) determining whether the input data value represents a blank pixel, and: (i) setting a count (e.g., a HopCount variable) to zero, if the input data value does not represent a blank pixel; (ii) adjusting (e.g., increasing) the count, if the input data value represents a blank pixel; and (iii) setting said residual error value to zero if the count has achieved the predetermined threshold; (f) diffusing the residual error value to at least one neighboring pixel position to be subsequently processed; and (g) performing acts (a) through (f) for at least one subsequent pixel of the multi-level image, wherein the at least one subsequent pixel position will exhibit an input data value, and wherein the residual error value is used as at least a component of the first error value for the at least one subsequent pixel position.

In accordance with another aspect of the present invention, a method for reducing the effects of migrating residual error in an image forming apparatus is provided, in which the method comprises the following acts: (a) receiving an input data value for a first pixel position of a multi-level image; (b) receiving a first error value from at least one preceding pixel position; (c) adding the input data value to the first error value, thereby generating a resulting new value; (d) determining, via a halftoning procedure on the new value, whether a dot will be recorded at the first pixel position, and: (i) if a dot is not recorded, loading a current value of the new value into a residual error value; (ii) if a dot is recorded, subtracting a predetermined dot worth value from the new value, and loading the result into the residual error value; (e) determining whether the input data value represents a blank pixel, and: (i) setting a count to zero, if the input data value does not represent a blank pixel; (ii) adjusting the count, if the input data value represents a blank pixel; and (iii) reducing the residual error value if the count has achieved the predetermined threshold; (f) diffusing the residual error value to at least one neighboring pixel position to be subsequently processed; and (g) performing acts (a) through (f) for at least one subsequent pixel of the multi-level image, wherein the at least one subsequent pixel position will exhibit an input data value, and wherein the residual error value is used as at least a component of the first error value for the at least one subsequent pixel position.

In accordance with yet another aspect of the present invention, a method for reducing the effects of migrating residual error in an image forming apparatus is provided, in which the method comprises the following acts: (a) adding an input pixel value of a multi-level image to a previous pixel error value, and generating a resulting new value; (b) comparing the new value to a predetermined threshold, then directing a resulting binary output pixel value to a recording element; (c) subtracting {the binary output pixel value times a predetermined dot worth value} from the new value, and generating a resulting residual error; (d) determining if the input pixel value represents a blank pixel, and if so, performing a special function upon the residual error, thereby generating a modified residual error; (e) diffusing the modified residual error to at least one neighboring pixel position to be subsequently processed; and (f) performing acts (a) through (e) for at least one subsequent pixel of the multi-level image, wherein the at least one subsequent pixel position exhibits an input pixel value, and wherein the modified residual error is used as at least a component of the previous pixel error value for the at least one subsequent pixel position.

In accordance with still a further aspect of the present invention, a method for modifying residual error in an image forming apparatus is provided, in which the method includes the following acts: inspecting an input pixel value of multi-level input image data, and determining whether said input pixel value represents a blank pixel; if said input pixel value does not represent a blank pixel, processing said input pixel value. If said input pixel value represents a blank pixel, then the method further includes the acts of determining if there are at least a predetermined number X of consecutive blank pixels in said multi-level input image data, and processing said input pixel value if there have not been at least X consecutive blank pixels, and processing said input pixel value and modifying said residual error value generated by said error diffusion function if there have been at least X consecutive blank pixels.

In accordance with yet another aspect of the present invention, a method for modifying residual error in an image forming apparatus is provided, in which the method includes the following acts: determining whether a dot should be printed for a target input pixel of input image data; determining a residual error value to be diffused to at least one other pixel position; if the target input pixel comprises a blank pixel separated from a non-blank input pixel by at least a predetermined number of pixel positions, modifying said residual error value to be diffused to at least one other pixel position.

Still other advantages of the present invention will become apparent to those skilled in this art from the following description and drawings wherein there is described and shown an exemplary embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF AN EXEMPLARY EMBODIMENT

Reference will now be made in detail to the present exemplary embodiment of the invention, which is illustrated in the accompanying drawings, wherein like numerals indicate the same elements throughout the views.

As discussed above, the conventional error diffusion methodology used in many image processing systems—ones that accept image data comprising multi-level values (such as 0–255) and then perform halftoning to reduce the number of possible levels from 256 to two—will form a residual error as each input image pixel is thresholded in the halftoning process. Most conventional image forming apparatus systems will then send that residual error to more than one pixel location yet to be processed, either using a diffusion matrix or a set of diffusion coefficients that are each multiplied times the residual error for a predetermined pixel location, thus forming something like a vector quantity that has a direction and a magnitude of residual error. Many image processing systems used in digital printers will process the scanlines in more than one direction, and a serpentine processing methodology is quite common. This is true for both laser printers and ink jet printers.

As noted above, when residual error is allowed to migrate through input pixels that are blank, the result can be a situation where the "next" image data that has large enough pixel input values (such that one would normally expect dots to be printed) may become modified by the upstream residual error such that the dots will not be printed after all. This certainly can occur when the error is allowed to pass through blank pixels without being updated. One methodology for correcting some of the residual error migration problems is to divide the residual error by a "damping factor" every time the image process passes through a blank input pixel. In this manner, the residual error is gradually dampened (or "decimated") as it spreads away from its origin. This "damping factor" methodology carries almost no extra cost in machine equipment and in processing time, and can achieve a desired result by reducing residual error, particularly where multiple consecutive blank pixels are found in the input image data. The selection of a damping factor can depend on the output resolution of the printing device.

Another methodology of the present invention is to use a methodology referred to herein as a "hop count" method. A virtual or physical counter is provided that is associated with the error diffusion process. Every time the image processing of an input pixel passes through a blank input pixel, the hop count is incremented by one (1), and every time the image processing passes through a non-blank input pixel, the hop count is reset to zero (0). When the hop count value reaches a predetermined threshold, the residual error is either dropped (i.e., reset to zero), or the error is decimated (in a manner akin to the damping factor methodology described above). This hop count methodology will allow residual error to spread over a certain distance, but not indefinitely. This hop count methodology provides better control over the extent to which error can be spread, but from a computational aspect it is also more expensive.

It should be noted that a combination of the hop count methodology and the damping factor or decimation methodology can be provided, as discussed below. It will be understood that the word "decimation" does not necessarily mean that the residual error is divided by ten, but it means that the error could be divided by whatever damping factor numeric value is desired by the system designer.

It will also be understood that the methods of the present invention can be applied to monochrome data, which considers only grayscale values for black ink or black toner; of course, the same overall concepts can easily extend to color printers, in which more than one color channel is processed. In color printers, it would probably be best if the residual error processing is applied independently for each color plane.

Figure 1:
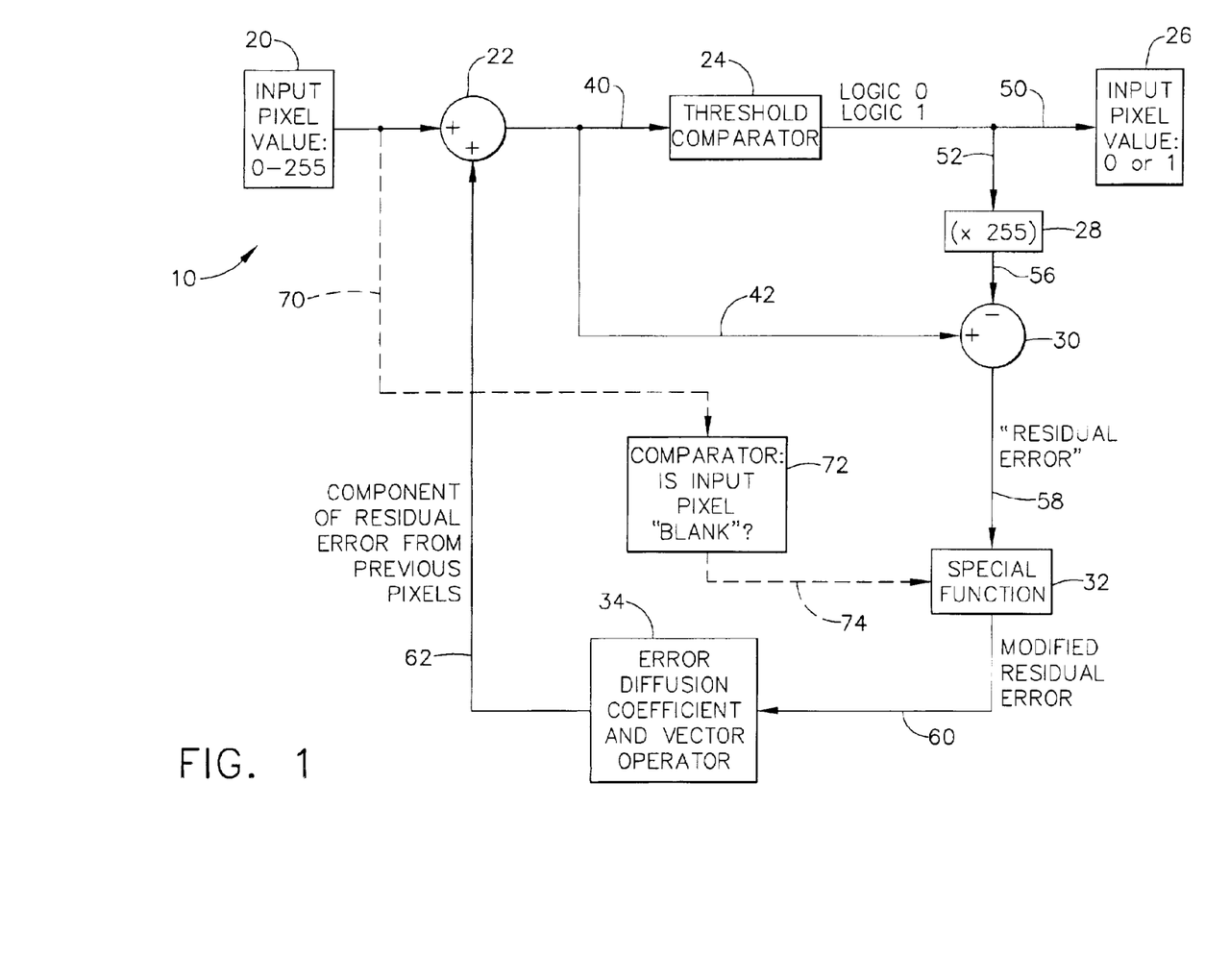
FIG. 1 is a block diagram showing some of the process steps of an error diffusion process used for image processing of an image forming apparatus, while showing certain processing components as functions in a mathematical or logical flow of image data.

Referring now to FIG. 1, a block diagram generally referred to by the reference numeral 10 is provided showing the thresholding and error diffusion processes according to one embodiment of the present invention. For purposes of explanation in this patent document, it will be assumed that the input pixel data is 8-bit data, thereby having a range of numeric values from 0–255, in which zero (0) is equal to the lowest intensity gray level, and "255" is equal to the greatest intensity for a saturated color, or for saturated black. Thus, these examples assume that a "white pixel" will have a value of zero (0) as input data, and that a white pixel is also the same as a "blank" pixel for this description. It will also be assumed that this flow chart (of FIG. 1) and the other flow charts provided in the later figures can be used for all process colors and for black, which for laser printers could be for cyan, magenta, yellow, and black (also known as CMYK). For ink jet printers, the process colors could be cyan, diluted cyan, magenta, diluted magenta, yellow, diluted yellow, and black, also known as CcMmYyK. Of course, other process colors could be used for printing or other type of recording systems, including red, green, and blue.

In FIG. 1, the input pixel values originate at a block 20, and as stated above, are assumed to have a numeric value in the range of 0–255. These input pixel values are directed, one pixel location at a time, to a summing function 22, and the output of that summing function is directed to a threshold comparator 24 via a flow path 40. This numeric value output from summing junction 22 is also directed to another math function 30 through a pathway 42, which will be described below.

The threshold comparator 24 will compare the "total" input value derived from the summer 22 to the appropriate threshold numeric value for this pixel location. If the total input value is greater than the threshold value, then the output will be a Logic 1, and that will represent a dot to be printed for this color plane. On the other hand, if the threshold comparison shows that the total input value at 40 is less than or equal to the threshold value, then the output value will be a Logic 0, which will represent a "no dot" and the printer will not print the color dot or black dot at this pixel location. It will be understood that the threshold comparator can use somewhat different logic and, if desired, the total input value at 40 could produce a dot if it was greater than or equal to the threshold value (rather than simply being greater than the threshold value).

The print engine (which is normal nomenclature for laser printers) or printhead (which is normal nomenclature for ink jet printers) will receive the Logic 0 or Logic 1 value along a pathway 50 to a block 26 which takes the output pixel value of zero or one, and that print engine or printhead at 26 will record a color dot or black dot, or will "record" a "no dot" at this pixel location.

The threshold comparator 24 produces a determination of either a dot or no dot result, which will also be important as to determining what the residual error will be that is diffused to other pixel locations that have yet to be processed. For purposes of explanation on flow chart 10, this Logic 0 or Logic 1 value is also directed through a pathway 52 to a multiplier block 28 where the value is multiplied by 255, which is equivalent to the "dot worth" of a printed dot when a Logic 1 result is output from the threshold comparator 24. Thus a numeric value of either "0" or "255" is directed through a pathway 56 to a subtraction function 30. It will be understood that the precise logic for performing these functions is not necessarily as illustrated in FIG. 1, and in fact the flow charts of FIGS. 2–4 do not use this multiplication function of block 28. This block 28 is merely provided for purposes of explanation in FIG. 1 so that the math is "correct."

The "total input pixel value" that is output from the summing block 22 is directed along a pathway 42 where it arrives at the subtraction block 30, at which time the value of either zero (0) or "255" is subtracted from this total pixel value 42. The output of the subtraction block 30 is the residual error, which is directed along a pathway 58 to a "special function" block 32. The special function uses a methodology described below that may modify the numeric value of the residual error, and the output of this special function block 32 is directed along a pathway 60 to a block 34 where the error diffusion coefficient and vector operators perform their functions to spread the value of the modified residual error to the appropriate pixel locations that have yet to be processed. For each individual pixel location, a component of the residual error will be directed along a pathway 62 back to the adder function at block 22. It will be understood that the residual error component along pathway 62 is the "accumulated" residual error from the appropriate previous pixel locations with respect to the "current" or "target" pixel of interest being processed at the present time at the threshold comparator 24.

The "raw" input pixel value at step 20 is also directed to a comparator step 72 via a pathway 70. Comparator 72 determines whether the input pixel at this pixel location is blank. If so, a signal is sent to the special function block 32 via a logic pathway 74, and special function block 32 will act accordingly.

As noted above, the flow chart of FIG. 1 is merely a general graphical description of the flow pattern for numeric values used in an error diffusion process according to one embodiment of the present invention. In general, the flow logic of FIG. 1 is conventional prior art, except for the special function 32. This special function is specifically designed to perform some type of modification on the value of the residual error when blank input pixels are found in the input data coming from the "input pixel value" block 20.

Figure 2:
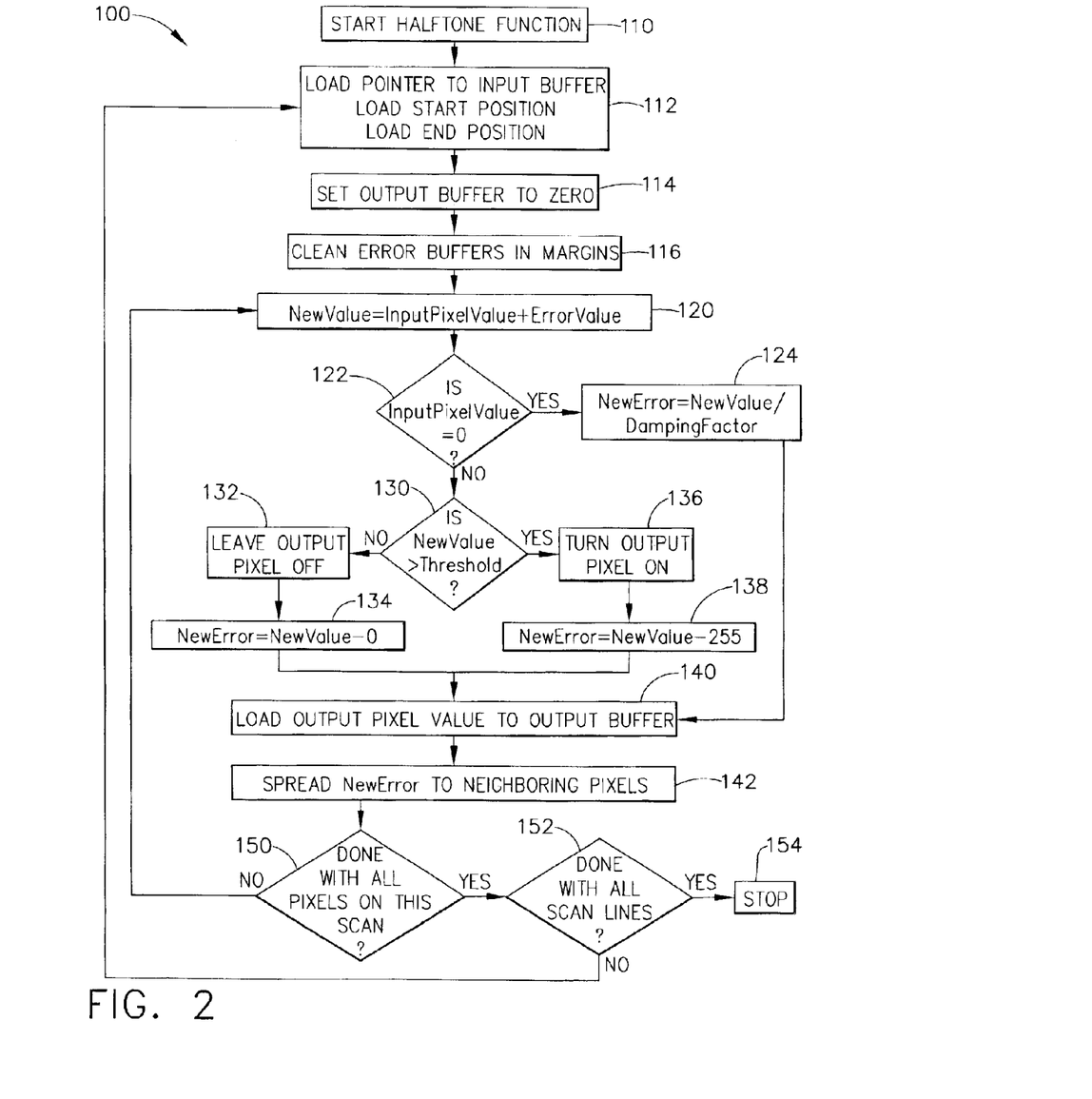
FIG. 2 is a flow chart of some of the logical steps in an error diffusion process that decimates residual error when blank pixels are found in the input image data.

Referring now to FIG. 2, a flow chart 100 illustrates some of the steps in an error diffusion/halftone function that is generally similar to prior art embodiments, which, in one embodiment, can be combined with aspects of the present invention. At a step 110, the halftoning function starts. The next step 112 loads a pointer to the appropriate memory location for the input buffer, and loads the start position and the end position of this input buffer. The input buffer can hold the data for a complete scanline of bitmap information for the print engine, or for the printhead. The start position and end position represent the first and last pixels that have image data that is not blank or "zero" data—in other words, this is input image data that is not equal to blank pixels, and all space to the left of the start position and all space to the right of the end position can be considered as margins.

At a step 114, the output buffer is set to zero, and the output buffer will hold the halftoned bitmap for this same scanline. By setting the output buffer to zero, the buffer is cleared, and only bits that are later set to one will be printed as dots for this particular color plane. The next function is a step 116 that cleans the error buffers in the margins for this particular scanline. In effect, the residual error is cleared to zero for all pixel positions from the left-most pixel position through the "start position," and the residual error is also cleared to zero for the pixel positions from the "end position" through the right-most position at the end of the scanline. Similar functions will be seen when inspecting the flow charts of FIGS. 3 and 4, and thus will not need to be described in the same detail below with regard to those figures, but it will be understood what their functions represent from the above description.

The next function is a step 120, which adds the input pixel value to an error value, and the result is the "NewValue," and this adding function essentially represents the summing function 22 seen on FIG. 1. A variable "InputPixelValue" represents the "raw" input image data at this pixel position now being processed, and a variable "ErrorValue" represents the component of residual error that is directed toward the current pixel being processed from previous pixels that have already been processed.

The next function in flow chart 100 is a decision step 122 that determines whether the InputPixelValue is equal to zero. If the answer is YES, a step 124 takes the numeric value of the variable NewValue and divides it by a "damping factor," and sets this value into a variable called "NewError." This NewError is equivalent to the residual error normally found in error diffusion procedures, and its numeric value will be spread to remaining pixels at the appropriate steps. In the case where step 124 comes into play in flow chart 100, the numeric value of NewError will be directed to a step 140, which will be discussed below.

If the InputPixelValue is not equal to zero at decision step 122, then a decision step 130 determines whether the numeric value for variable NewValue is greater than a threshold value. If the answer is YES, a step 136 turns the output pixel ON for this current pixel location. If the result is NO, then a step 132 leaves the output pixel OFF for the current pixel position.

If the output pixel is to be left OFF, then the logic flows from step 132 to a step 134 where the numeric value of NewValue is set equal to the variable NewError, and this value becomes the residual error at this point in the flow chart 100. On the other hand, if the output pixel was turned ON at step 136, then a step 138 takes the numeric value of the variable NewValue and subtracts "255" from that variable, and sets that number into the value for the variable NewError. This NewError variable represents the residual error utilized at this point inflow chart 100.

A step 140 now loads the output pixel value to the output buffer, which means either a Logic 1 or a Logic 0 for this pixel position is loaded into the output buffer. Of course, using the numeric values and assumptions discussed above, a Logic 1 represents a dot that will be printed at this pixel position for this color plane, while a Logic 0 represents a "no dot" that will be "printed" for this pixel position. From inspecting FIG. 2, it can be seen that there are three separate pathways that the residual error can take to arrive at step 140. The logic flow travels from step 140 to a step 142, where the residual error is now spread as the variable NewError to neighboring pixels. This "spreading" effect is well known in the prior art, and can be based upon an error diffusion matrix, or it can be based upon error coefficients and predetermined pixel "vectors" that determine exactly where the "next to be processed" pixels will receive the current error components. Of course, if image processing for various scanlines is performed in different directions (such as a serpentine methodology), then the neighboring pixels that receive the error components of the residual error can be located either to the left or to the right of the current pixel being processed, as one would view the bitmap being formed.

A decision step 150 now determines whether all of the pixels on this scanline have been processed. If the answer is NO, the logic flow is directed back to step 120 where the variable NewValue is loaded with the sum of the next raw InputPixelValue plus the ErrorValue. If the result was YES at step 150, then a decision step 152 determines whether all of the scanlines have been processed for this particular bitmap. If the answer is NO, then the logic flow is directed back to step 112, where the pointer is loaded to the next position in the input buffer, and the start and end positions for this scanline are again loaded. If the result was YES at step 152, then image processing is completed for this bitmap at a step 154.

A listing of pseudo code is provided immediately below as a "CODE LIST #1."

CODE LIST #1

```
// Decimation method
// This is for one color plane. Others will be similar.
  HalftoneConvert(pointerToInputBuffer, StartPosition, Endposition)
  {
    Set Output buffer to zero;
    Clean error buffer from right;
    Clean error buffer from left;
    for (StartPosition to EndPosition)
    {
      Obtain pixel value P from Input buffer;
      Obtain error from E error buffer;
      NewValue = P + E;
      if( P = 0)
      {
        NewError = NewValue/DampingFactor;
      }
      else
      {
        if (NewValue > THRESHOLD)
        {
          Turn the output pixel on;
          NewError = NewValue – 255;
        }
        else
        {
          Leave the output pixel off;
          NewError = NewValue – 0;
        }
      }
      Spread NewError to neighboring pixels;
    }
    return;
  }
End
```

In CODE LIST #1, it will be understood that the variable "P" is the same as the variable "InputPixelValue" of FIG. 2; and that the variable "E" is equal to the variable "ErrorValue" of FIG. 2. The flow chart 100 corresponds to CODE LIST #1, and this information corresponds to what is referred to herein as a "decimation method" of manipulating the residual error in an error diffusion process. Other methods for manipulating the residual error will now be discussed, below.

Figure 3:
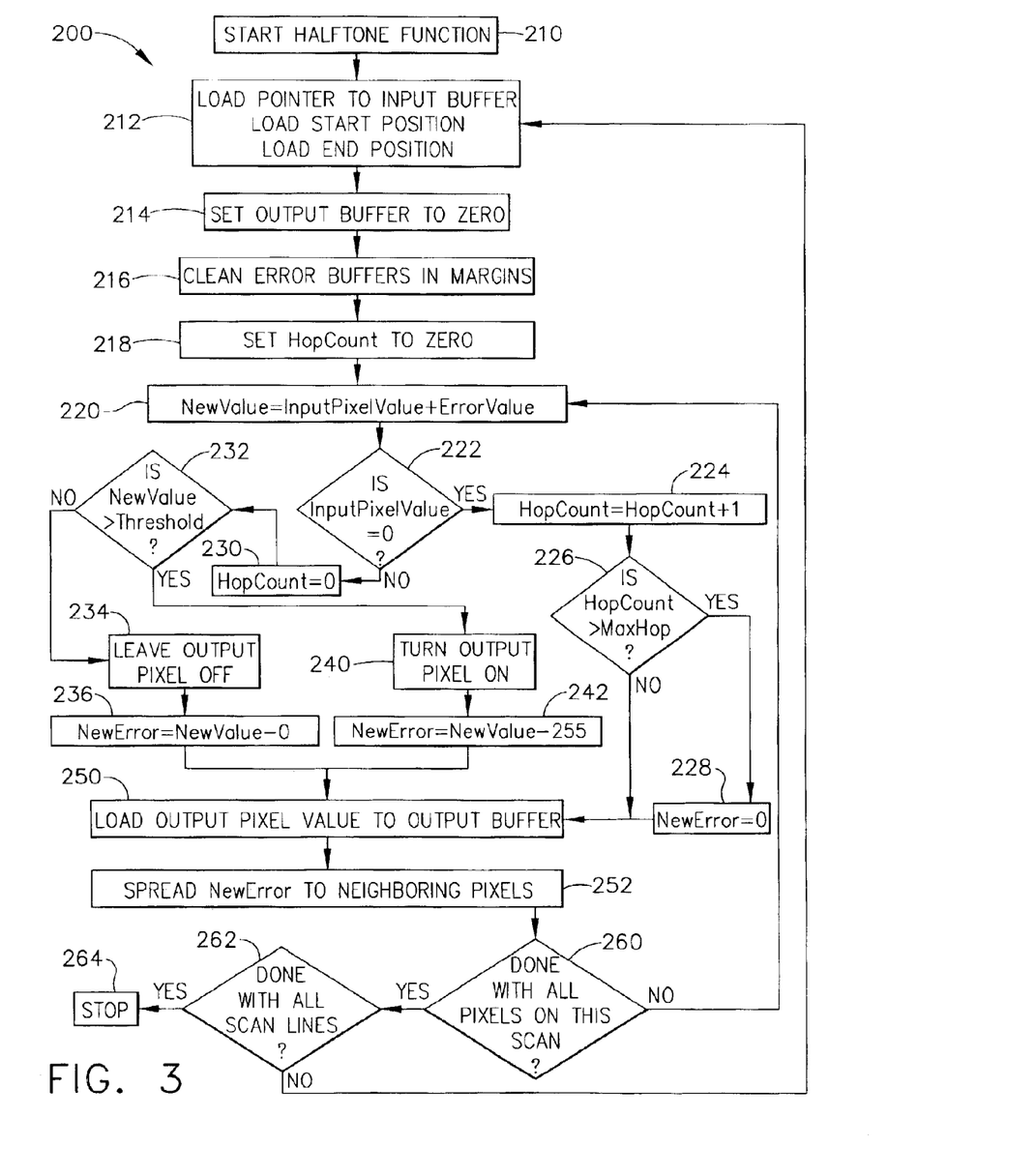
FIG. 3 is a flow chart of some of the steps of an error diffusion process, using a "hop count" that puts limits on the migration of residual error when blank pixels are encountered in the input image data.

Referring now to FIG. 3, a flow chart generally designated by the reference numeral 200 illustrates some of the logical steps for a second embodiment, referred to as the "hop count" methodology, that is used to modify the residual error under certain circumstances. A step 210 starts the halftone function using this methodology. A step 212 loads a pointer to the appropriate memory location for the input buffer for this scanline now to be processed, and then also the start position and the end position are loaded. These functions were discussed above in greater detail, in reference to the flow chart 100 of FIG. 2. A step 214 sets the output buffer to zero, and a step 216 cleans the error buffers in the margins for this scanline.

A variable called "HopCount" is now set to zero (0) at a step 218. This HopCount variable is of interest in flow chart 200, and represents a value that could be manipulated in a hardware counter, for example, or it could be a value manipulated in any register in a microprocessor or microcontroller, or in any memory location that can be accessed by a microprocessor or microcontroller. This includes memory registers or memory buffers within an ASIC (Application Specific Integrated Circuit), and ASICs are typically used in modern printers. Some ASICs also include a microprocessor or microcontroller built therewithin.

A step 220 now inputs the "raw" value from the image data at the current pixel position as a variable "InputPixelValue" and adds the numeric value of a variable "ErrorValue," resulting in a sum that is set into a variable called "NewValue." This essentially represents the summing block 22 on the flow chart of FIG. 1.

A decision step 222 now determines whether the InputPixelValue is equal to zero (0), and if the answer is YES, a step 224 increments (or otherwise increases) the HopCount variable. If the result is NO at step 222, then a step 230 sets the value of the HopCount variable equal to zero (0), and the logic flow is directed to a decision step 232, discussed below.

If the InputPixelValue was zero, which means that the input pixel was a "blank" pixel, then after the HopCount is incremented, a decision step 226 determines whether the numeric value of the variable HopCount is greater than a variable called "MaxHop." This variable MaxHop is essentially a threshold that is predetermined by the system designer, and once exceeded, will effect a special function on the residual error. This in essence is in reference to the "special function" 32 of the flow chart 10 of FIG. 1.

If the result was NO at decision step 226 (i.e., the MaxHop threshold was not yet exceeded), then the value in the variable NewError will not be altered, and the logic flow will now be directed to step 250, discussed below. On the other hand, if the result was YES at decision step 226, then a step 228 will set the numeric value of the variable NewError equal to zero (0). The logic flow will now be directed to step 250, discussed below.

If the InputPixelValue was not equal to zero, then a decision step 232 will determine whether the numeric value for the variable NewValue is greater than a predetermined threshold. If the answer is NO, then a step 234 will leave the output pixel OFF, and a step 236 will load the numeric value of variable NewValue into the variable NewError. This represents the residual error, which essentially is set equal to the variable NewValue without modification, since the output pixel at this pixel location was left OFF, and no dot will be printed.

If the result was YES at decision step 232, then a step 240 will turn the output pixel ON for this pixel location, and a step 242 will subtract a numeric value "255" (i.e., the "dot worth" of the printed pixel) from the current numeric value of the variable NewValue, and set this result into the variable NewError. This represents the residual error that will be diffused to remaining pixels, and in this circumstance, the residual error will be substantially less because an output pixel was turned ON, and a dot will be printed at this pixel position.

A step 250 now will load the output pixel value to the output buffer. This output pixel value will either be Logic 0 or Logic 1, depending upon whether a dot is to be printed at this pixel location for this color plane. As can be seen by inspecting FIG. 3, the residual error at this point in flow chart 300 can come from four different directions, i.e., from steps 236, 242, 226, or 228. This residual error is now spread to neighboring pixels at a step 252, in which the variable NewError represents the residual error, and its current numeric value is spread to neighboring pixels in a predetermined pattern, as discussed above.

A decision step 260 now determines whether all of the pixels on this scanline have been processed. If the answer is NO, then the logic flow is directed back to step 220; if the answer is YES, then the logic flow is directed to a decision step 262. At step 262, it is determined whether all of the scanlines for this particular bitmap have been processed. If the answer is NO, the logic flow is directed back to step 212; if the answer is YES, then the halftoning function is complete for this particular bitmap, and the logic flow is directed to a "STOP" step 264.

A result of the hop count methodology is that residual error cannot indefinitely travel across blank pixels such that the residual error may affect portions of image data that are physically far removed from "earlier" image data that produced the residual error in the first place. If the hop count threshold value is set equal to "600," for example, and if the print resolution is 1200 dpi (dots per inch), then it would require a fill one-half inch of blank pixels before the residual error is set to zero at step 228. This one-half inch of blank space may be too much as far as many printer designers are concerned, but of course, the hop count threshold value (i.e., the "MaxHop" variable at step 226) can be set to any desired numeric value.

An example software code in pseudo code is provided below, as CODE LIST #2. It will be understood that the variables "P" and "E" have the same meanings as those discussed above in reference to CODE LIST #1.

CODE LIST #2

```
// Hop Count method
// This is for one color plane. Others will be similar.
  HalftoneConvert(pointerToInputBuffer, StartPosition, Endposition)
  {
    Set Output buffer to zero;
    Clean error buffer from right;
    Clean error buffer from left;
    Set HopCount to zero;
    for (StartPosition to EndPosition)
    {
      Obtain pixel value P from Input buffer;
      Obtain error from E error buffer;
      NewValue = P + E;
      if( P = 0)
      {
        HopCount = HopCount + 1;
        if(HopCount > MaxHop)
        {
```

-continued

```
          NewError = 0;
        }
      }
      else
      {
        HopCount = 0;
        if (NewValue > THRESHOLD)
        {
          Turn the output pixel on;
          NewError = NewValue − 255;
        }
        else
        {
          Leave the output pixel off;
          NewError = NewValue − 0;
        }
      }
      Spread NewError to neighboring pixels;
    }
    return;
  }
End
```

Figure 4:
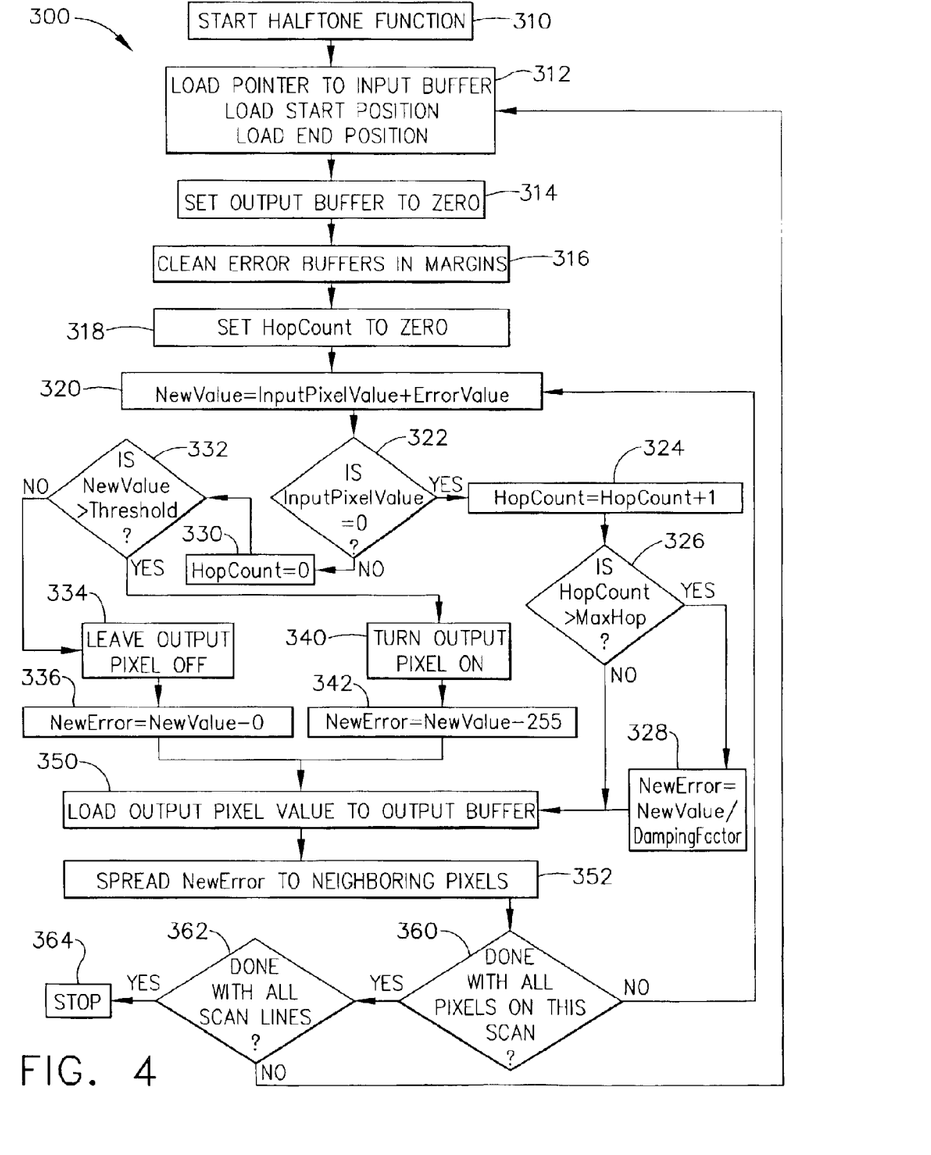
FIG. 4 is a flow chart showing some of the logical steps of an error diffusion process, which combines a decimation methodology with a hop count methodology for limiting the migration of residual error when blank pixels are found in the input image data.

Referring now to FIG. 4, a flow chart generally designated by the reference numeral 300 illustrates some of the logical steps for another embodiment using the "hop count" methodology. A step 310 starts the halftone function using this methodology. A step 312 loads a pointer to the appropriate memory location for the input buffer for this scanline now to be processed, and then also the start position and the end position are loaded. These functions were discussed above in greater detail, in reference to the flow chart 100 of FIG. 2. A step 314 sets the output buffer to zero, and a step 316 cleans the error buffers in the margins for this scanline.

A variable called "HopCount" is now set to zero (0) at a step 318. This HopCount variable (as in flow chart 200) represents a value that could be manipulated in a hardware counter, for example, or it could be a value manipulated in any register in a microprocessor or microcontroller, or in any memory location that can be accessed by a microprocessor or microcontroller. This includes memory registers or memory buffers within an ASIC (Application Specific Integrated Circuit), and ASICs are typically used in modern printers. Some ASICs also include a microprocessor or microcontroller built therewithin.

A step 320 now inputs the "raw" value from the image data at the current pixel position as a variable "InputPixelValue" and adds the numeric value of a variable "ErrorValue," resulting in a sum that is set into a variable called "NewValue." This essentially represents the summing block 22 on the flow chart of FIG. 1.

A decision step 322 now determines whether the InputPixelValue is equal to zero (0), and if the answer is YES, a step 324 increments (or otherwise increases) the HopCount variable. If the result is NO at step 322, then a step 330 sets the value of the HopCount variable equal to zero (0), and the logic flow is directed to a decision step 332, discussed below.

If the InputPixelValue was zero, which means that the input pixel was a "blank" pixel, then after the HopCount is incremented, a decision step 326 determines whether the numeric value of the variable HopCount is greater than a variable called "MaxHop." This variable MaxHop is essentially a threshold that is predetermined by the system designer, and once exceeded, will effect a special function on the residual error. This in essence is in reference to the "special function" 32 of the flow chart 10 of FIG. 1.

If the result at decision step 326 was NO (i.e., the MaxHop threshold was not yet exceeded), then the residual error is not affected (i.e., the value in the variable NewError will not be altered), and the logic flow is directed to a step 350, discussed below. On the other hand, if the result was YES at step 326, then a step 328 will take the numeric value of the variable NewValue and divide it by a "DampingFactor" variable, and load the result into a variable "NewError." The logic flow is then directed to the step 350, discussed below.

The steps 322, 324, 326, and 328 represent the combination of the hop count and decimation methodologies, and one can see the difference between step 328 on FIG. 4 and step 228 of FIG. 3: in FIG. 3, the variable NewError is set to zero (0), whereas in FIG. 4, the variable NewError is not automatically set to zero, but instead is divided by a damping factor. Of course, if the damping factor is equal to two (2), and the current value for the variable NewValue is equal to one (1), then the result will be zero (0), assuming that the quotient is rounded down.

It will be understood that the treatment of the NewError value in steps 124 and 328 requires that the NewError value be reduced in absolute magnitude. This can be achieved in several different ways, including a "pure decimation," which would reduce the absolute magnitude by 10%. Alternative ways included the following: (1) dividing the NewError value by a constant numeric value (such as two, as discussed above); (2) dividing the NewError value by a variable numeric value; (3) subtracting a constant numeric value from the NewError value; and (4) subtracting a variable numeric value from the NewError value. In alternative methodologies (3) and (4), immediately above, it will be understood that the object is to reduce the NewError value eventually to zero, and not to start counting through zero and beyond into the opposite numeric "sign" (i.e., one would not subtract down from +150, for example, then through zero and into negative numbers; instead, one would stop at zero). Therefore, it would likely be best to work with absolute values in methodologies (3) and (4), or perhaps in all possible methodologies of the present invention.

If the InputPixelValue was not equal to zero, then a decision step 332 will determine whether the numeric value for the variable NewValue is greater than a predetermined threshold. If the answer is NO, then a step 334 will leave the output pixel OFF, and a step 336 will load the numeric value of variable NewValue into the variable NewError. This represents the residual error, which essentially is set equal to the variable NewValue without modification, since the output pixel at this pixel location was left OFF, and no dot will be printed.

If the result was YES at decision step 332, then a step 340 will turn the output pixel ON for this pixel location, and a step 342 will subtract a numeric value "255" (i.e., the "dot worth" of the printed pixel) from the current numeric value of the variable NewValue, and set this result into the variable NewError. This represents the residual error that will be diffused to remaining pixels, and in this circumstance, the residual error will be substantially less because an output pixel was turned ON, and a dot will be printed at this pixel position.

A step 350 now will load the output pixel value to the output buffer. This output pixel value will either be Logic 0 or Logic 1, depending upon whether a dot is to be printed at this pixel location for this color plane. As can be seen by inspecting FIG. 4, the residual error at this point in flow chart 300 can come from four different directions, i.e., from steps 336, 342, 326, or 328. This residual error is now spread to neighboring pixels at a step 352, in which the variable NewError represents the residual error, and its current numeric value is spread to neighboring pixels in a predetermined pattern, as discussed above.

A decision step 360 now determines whether all of the pixels on this scanline have been processed. If the answer is NO, then the logic flow is directed back to step 320; if the answer is YES, then the logic flow is directed to a decision step 362. At step 362, it is determined whether all of the scanlines for this particular bitmap have been processed. If the answer is NO, the logic flow is directed back to step 312; if the answer is YES, then the halftoning function is complete for this particular bitmap, and the logic flow is directed to a "STOP" step 364.

An example software code in pseudo code is provided below, as CODE LIST #3. It will be understood that the variables "P" and "E" have the same meanings as those discussed above in reference to CODE LIST #1.

CODE LIST #3

```
// Combined method
// This is for one color plane. Others will be similar.
   HaltoneConvert(pointerToInputBuffer, StartPosition, Endposition)
      {
         Set Output buffer to zero;
         Clean error buffer from right;
         Clean error buffer from left;
         Set HopCount to zero;
         for (StartPosition to EndPosition)
            {
               Obtain pixel value P from Input buffer;
               Obtain error from E error buffer;
               NewValue = P + E;
               if( P = 0)
               {
                  HopCount = HopCount + 1;
                  if(HopCount > MaxHop)
                  {
                     NewError = NewValue/DampingFactor;
                  }
               }
               else
               {
                  HopCount = 0;
                  if (NewValue > THRESHOLD)
                  {
                     Turn the output pixel on;
                     NewError = NewValue - 255;
                  }
                  else
                  {
                     Leave the output pixel off;
                     NewError = NewValue - 0;
                  }
               }
               Spread NewError to neighboring pixels;
            }
         return;
      }
End
```

A result of the combined methodology of flow chart 300 is that the residual error will begin to be "dampened" after the HopCount value exceeds the hop count threshold value (i.e., the variable "MaxHop" at step 326). Of course, the DampingFactor variable in step 328 will not completely clear the residual error in one stroke (in the variable NewError), unless the DampingFactor numeric value is quite large. Typically, an exemplary value for the DampingFactor variable might only have a numeric value of two (2), and so the residual error will only be divided by two, rather than cleared to zero (0) once the MaxHop threshold has been exceeded by the HopCount. Of course, if the next input pixel value is still blank, then the new value for HopCount will still be above the threshold MaxHop at step 326, and the residual NewError will again be decimated by the damping factor at step 328. This process will continue until the input value of a subsequent pixel location becomes a non-zero value.

One potential advantage of the combined flow chart methodology illustrated in FIG. 4 is that the residual error can be left untouched for a certain number of consecutive pixel locations until the maximum threshold value is exceeded by the hop count, and then once the threshold value has been exceeded, the residual error can be rather gradually reduced by the DampingFactor variable, rather than completely eliminating the residual error immediately upon exceeding the MaxHop threshold value. The system designer for the image processing software of the printer has complete flexibility as to the "suddenness" or "gradualness" in which the residual error is reduced by the damping factor value, and also the system designer has complete control as to just how far in number of consecutive blank input pixels before exceeding the hop count threshold in the first place.

The numeric values for MaxHop and the DampingFactor can be selected based upon the "spread ratio" used in diffusing the residual error. For the purposes of this patent document, the term "spread ratio" refers to the coefficients used to multiply the residual error for each error component that will be "aimed" at pixel locations yet to be processed. For example, if the residual error is to be diffused toward three pixel locations (and if image processing is from left-to-right, the three pixel locations, for example, could be: the next right location, the next left location on the next scanline, and directly below on the next scanline), and if the diffusion coefficients are 0.50/0.25/0.25, for example, then the spread ratio would be 2:1:1. The printer's resolution may also be one of the determining factors for selecting the numeric values for MaxHop and the DampingFactor variables. For example, if the print resolution is user-changeable, and if the user alters the print resolution for a particular print job, then the spread ratio may also change, and further the MaxHop value and/or the DampingFactor value may also be affected.

It will be understood that the precise logical functions illustrated in the flow charts of FIGS. 2–4 can be altered without departing from the principles of the present invention. It will also be understood that the three listings of pseudo code presented above are examples only, and that the actual software source code could look quite different depending upon the computer programming language used by a system designer, without departing from the principles of the present invention.

It will also be understood that the logical operations described in relation to the flow charts and logic/math diagrams of FIGS. 1–4 can be implemented using sequential logic, such as by using microprocessor technology, or using a logic state machine, or perhaps by discrete logic; it even could be implemented using parallel processors. One exemplary embodiment uses a microprocessor or a microcontroller to execute software instructions that are stored in memory cells within an ASIC. In fact, the entire microprocessor or microcontroller along with dynamic RAM and executable ROM may be contained within a single ASIC, in an exemplary mode of the present invention. Of course, other types of circuitry could be used to implement these logical operations depicted in the drawings without departing from the principles of the present invention.

It will be further understood that the precise logical operations depicted in the flow charts of FIGS. 2–4, and discussed above, could be somewhat modified to perform similar, although not exact, functions without departing from the principles of the present invention. The exact nature of some of the decision steps and other commands in these flow charts are directed toward future specific models of printer systems (those involving Lexmark printers, for example) and certainly similar, but somewhat different, steps would be taken for use with other types of printing systems in many instances, with the overall inventive results being the same.

The foregoing description of exemplary embodiments of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for reducing the effects of migrating residual error in an image forming apparatus, said method comprising:
    (a) receiving an input data value for a first pixel position of a multi-level image;
    (b) receiving a first error value from at least one preceding pixel position;
    (c) adding said input data value to said first error value, thereby generating a resulting new value;
    (d) determining, via a halftoning procedure on said new value, whether a dot will be recorded at said first pixel position, and:
        (i) if a dot is not recorded, loading a current value of said new value into a residual error value;
        (ii) if a dot is recorded, subtracting a predetermined dot worth value from said new value, and loading the result into said residual error value;
    (e) determining whether said input data value represents a blank pixel, and:
        (i) setting a count to zero, if said input data value does not represent a blank pixel;
        (ii) adjusting said count, if said input data value represents a blank pixel; and
        (iii) setting said residual error value to zero if said count has achieved said predetermined threshold;
    (f) diffusing said residual error value to at least one neighboring pixel position to be subsequently processed; and
    (g) performing acts (a) through (f) for at least one subsequent pixel of said multi-level image, wherein said at least one subsequent pixel position will exhibit an input data value, and wherein said residual error value is used as at least a component of said first error value for said at least one subsequent pixel position.

2. The method as recited in claim 1, wherein said predetermined dot worth value is equal to "255" when a resolution of said multi-level image comprises 8-bit data, and when "0" is equal to white for the current color plane being processed.

3. The method as recited in claim 1, wherein said halftoning procedure comprises comparing said new value to a predetermined second threshold value.

4. The method as recited in claim 3, wherein said predetermined second threshold value is a constant numeric value for all pixel positions of said multi-level image.

5. The method as recited in claim 3, wherein said predetermined second threshold value varies for different pixel positions of said multi-level image.

6. The method as recited in claim 1, wherein said act of adjusting said count comprises incrementing said count by one.

7. The method as recited in claim 1, wherein said act by which said count has achieved said predetermined threshold, comprises one of: (a) said count is greater than said predetermined threshold; and (b) said count is greater than or equal to said predetermined threshold.

8. The method as recited in claim 1, wherein said act of recording a dot comprises printing a dot having a color corresponding to the current color plane being processed by one of: (a) a print engine of a laser printer; and (b) a printhead of an ink jet printer.

9. The method as recited in claim 1, wherein said predetermined threshold is altered for different printing conditions.

10. A method for reducing the effects of migrating residual error in an image forming apparatus, said method comprising:

(a) receiving an input data value for a first pixel position of a multi-level image;

(b) receiving a first error value from at least one preceding pixel position;

(c) adding said input data value to said first error value, thereby generating a resulting new value;

(d) determining, via a halftoning procedure on said new value, whether a dot will be recorded at said first pixel position, and:

(i) if a dot is not recorded, loading a current value of said new value into a residual error value;

(ii) if a dot is recorded, subtracting a predetermined dot worth value from said new value, and loading the result into said residual error value;

(e) determining whether said input data value represents a blank pixel, and:

(i) setting a count to zero, if said input data value does not represent a blank pixel;

(ii) adjusting said count, if said input data value represents a blank pixel; and (iii) reducing said residual error value if said count has achieved said predetermined threshold;

(f) diffusing said residual error value to at least one neighboring pixel position to be subsequently processed; and (g) performing acts (a) through (f) for at least one subsequent pixel of said multi-level image, wherein said at least one subsequent pixel position will exhibit an input data value, and wherein said residual error value is used as at least a component of said first error value for said at least one subsequent pixel position.

11. The method as recited in claim 10, wherein said act of reducing said residual error value comprises one of: (a) decimating said residual error value by a predetermined percentage; (b) dividing said residual error value by a constant numeric value; (c) dividing said residual error value by a variable numeric value; (d) subtracting a constant numeric value from said residual error value; and (e) subtracting a variable numeric value from said residual error value.

12. The method as recited in claim 10, wherein said predetermined dot worth value is equal to "255" when a resolution of said multi-level image comprises 8-bit data, and when "0" is equal to white for the current color plane being processed.

13. The method as recited in claim 10, wherein said halftoning procedure comprises comparing said new value to a predetermined second threshold value.

14. The method as recited in claim 13, wherein said predetermined second threshold value is a constant numeric value for all pixel positions of said multi-level image.

15. The method as recited in claim 13, wherein said predetermined second threshold value varies for different pixel positions of said multi-level image.

16. The method as recited in claim 10, wherein said act of adjusting said count comprises incrementing said count by one.

17. The method as recited in claim 10, wherein said act by which said count has achieved said predetermined threshold, comprises one of: (a) said count is greater than said predetermined threshold; and (b) said count is greater than or equal to said predetermined threshold.

18. The method as recited in claim 10, wherein said act of recording a dot comprises printing a dot having a color corresponding to the current color plane being processed by one of: (a) a print engine of a laser printer; and (b) a printhead of an ink jet printer.

19. The method as recited in claim 10, wherein said predetermined threshold is altered for different printing conditions.

20. A method for reducing the effects of migrating residual error in an image forming apparatus, said method comprising:

(a) adding an input pixel value of a multi-level image to a previous pixel error value, and generating a resulting new value;

(b) comparing said new value to a predetermined threshold, then directing a resulting binary output pixel value to a recording element;

(c) subtracting {said binary output pixel value times a predetermined dot worth value} from said new value, and generating a resulting residual error;

(d) determining if said input pixel value represents a blank pixel, and if so, performing a special function upon said residual error, thereby generating a modified residual error;

(e) diffusing said modified residual error to at least one neighboring pixel position to be subsequently processed; and (f) performing acts (a) through (e) for at least one subsequent pixel of said multi-level image, wherein said at least one subsequent pixel position exhibits an input pixel value, and wherein said modified residual error is used as at least a component of said previous pixel error value for said at least one subsequent pixel position.

21. The method as recited in claim 20, wherein said predetermined dot worth value is equal to "255" when a resolution of said multi-level image comprises 8-bit data, and when "0" is equal to white for the current color plane being processed.

22. The method as recited in claim 20, wherein said recording element comprises one of: (a) a print engine of a laser printer; and (b) a printhead of an ink jet printer.

23. The method as recited in claim 20, wherein said special function comprises one of: (a) decimating said residual error by a predetermined percentage; (b) dividing said residual error by a constant numeric value; (c) dividing said residual error by a variable numeric value; (d) subtracting a constant numeric value from said residual error; and (e) subtracting a variable numeric value from said residual error.

24. The method as recited in claim 20, wherein said special function comprises one of:
  (a) adjusting a count value of a count each time said input pixel value represents a blank pixel until achieving a predetermined value, and then reducing an absolute value of said residual error; and if said input pixel value does not represent a blank pixel, resetting said count value of the count to zero;
  (b) adjusting a count value of a count each time said input pixel value represents a blank pixel until achieving a predetermined value, and then resetting said residual error to zero; and if said input pixel value does not represent a blank pixel, resetting said count value of the count to zero; and
  (c) reducing an absolute value of said residual error each time said input pixel value represents a blank pixel.

25. The method as recited in claim 24, wherein said predetermined value is altered for different printing conditions.

26. A method for modifying residual error in an image forming apparatus, said method comprising:
  (a) inspecting an input pixel value of multi-level input image data, and determining whether said input pixel value represents a blank pixel;
  (b) if said input pixel value does not represent a blank pixel, processing said input pixel value; and
  (c) if said input pixel value represents a blank pixel, determining if there are at least a predetermined number X of consecutive blank pixels in said multi-level input image data, and:
    (i) processing said input pixel value if there have not been at least X consecutive blank pixels; and
    (ii) processing said input pixel value and modifying said residual error value generated by said error diffusion function if there have been at least X consecutive blank pixels.

27. The method as recited in claim 26, wherein said residual error value is diffused to other pixel positions that have not yet been processed.

28. The method as recited in claim 26, wherein the act of modifying said residual error value comprises one of: (a) determining said residual error value by a predetermined percentage; (b) dividing said residual error value by a constant numeric value; (c) dividing said residual error value by a variable numeric value; (d) subtracting a constant numeric value from an absolute value of said residual error value; (e) subtracting a variable numeric value from an absolute value of said residual error value; and (f) setting said residual error value to zero.

29. The method as recited in claim 26, wherein said predetermined number X of consecutive blank pixels is altered for different printing conditions.

30. A method for modifying residual error in an image forming apparatus, said method comprising:
  (a) determining whether a dot should be printed for a target input pixel of input image data;
  (b) determining a residual error value to be diffused to at least one other pixel position; and
  (c) if said target input pixel comprises a blank pixel separated from a non-blank input pixel by at least a predetermined number of pixel positions, modifying said residual error value to be diffused to at least one other pixel position.

* * * * *